(12) United States Patent
Komowski (10) Patent No.: US 7,985,124 B2
(45) Date of Patent: Jul. 26, 2011

(54) DRUM-TYPE VALVE

(75) Inventor: Michael Komowski, Weil der Stadt-Merklingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 65 days.

(21) Appl. No.: 10/578,564

(22) PCT Filed: Nov. 5, 2004

(86) PCT No.: PCT/EP2004/012550
§ 371 (c)(1),
(2), (4) Date: Aug. 15, 2006

(87) PCT Pub. No.: WO2005/044605
PCT Pub. Date: May 19, 2005

(65) Prior Publication Data
US 2007/0128999 A1    Jun. 7, 2007

(30) Foreign Application Priority Data

Nov. 7, 2003   (DE) .................................. 103 52 533

(51) Int. Cl.
*B60H 1/34* (2006.01)
(52) U.S. Cl. ........................................ 454/155; 454/121
(58) Field of Classification Search .................. 454/155, 454/121, 139, 126, 156
See application file for complete search history.

(56) References Cited

U.S. PATENT DOCUMENTS

| 6,047,951 | A | 4/2000 | Ito et al. |
| 6,196,520 | B1 | 3/2001 | Vincent et al. |
| 6,319,112 | B2 * | 11/2001 | Komowski ..................... 454/139 |
| 6,616,060 | B2 * | 9/2003 | Parisi et al. .............. 237/12.3 B |
| 6,652,372 | B2 | 11/2003 | Muller |
| 2002/0016147 | A1 | 2/2002 | Muller |

FOREIGN PATENT DOCUMENTS

| DE | 42 28 866 C2 | 3/1994 |
| DE | 198 17 896 A1 | 11/1998 |
| DE | 198 19 280 A1 | 11/1998 |
| DE | 199 15 966 A1 | 10/1999 |
| DE | 100 53 814 A1 | 6/2001 |
| DE | 100 31 991 A1 | 1/2002 |
| DE | 101 52 597 A1 | 5/2003 |
| EP | 1 095 802 A | 5/2001 |
| EP | 1 306 240 | 5/2003 |
| FR | 2 771 966 A1 | 6/1999 |
| JP | 11-115454 A | 4/1999 |
| JP | 11-180129 A | 7/1999 |
| JP | 2003-237345 A | 8/2003 |

OTHER PUBLICATIONS

Office Action mailed Mar. 31, 2011 in related European Application No. 04 797 567.6.

* cited by examiner

*Primary Examiner* — Steven B McAllister
*Assistant Examiner* — Samantha A Miller
(74) *Attorney, Agent, or Firm* — Foley & Lardner LLP

(57) ABSTRACT

The invention relates to a drum-type valve (1; 101; 201; 301; 301') comprising: a partial cylindrical surface forming a first area (2; 102; 302); two circular segment surfaces each forming a second area (3; 103; 303), and; an outer encircling edge (4; 104; 304), which is disposed essentially in two planes, outwardly projects, and which is rests against correspondingly formed contact surfaces, whereby the drum-type valve (1; 101; 201; 301; 301') has at least one second edge (5; 105; 305).

9 Claims, 13 Drawing Sheets

DRUM-TYPE VALVE

BACKGROUND

The invention relates to a drum flap, in particular for distributing air in a motor vehicle ventilation system.

Drum flaps which have a rim running around the outside in order to increase the stability and to form a seal are known. Drum flaps of this type still leave something to be desired in terms of their leaktightness.

An air flap with a surrounding rim is also known from DE 100 53 814 A1, but this air flap deviates from a cylindrical shape.

DE 198 19 280 A1 has disclosed an air distribution apparatus with drum flap which comprises a housing with a cylindrical wall including at least two air passage openings, a flap mounted pivotably with respect to an axis of rotation and a generally cylindrical closure wall, which is mounted movably in relation to a flap body comprising two side parts, in a direction which is approximately radial with respect to the axis of rotation of the flap, with this movement being effected by adjustment means which are synchronized with the rotation of the flap, with the result that the closure wall can be moved away from the wall when the flap is in an opening position, and with the result that the closure wall can be moved toward the wall of the housing when said flap is in a closure position. An air distribution apparatus of this type has a large number of components and a complicated construction, making it too expensive to produce.

It is an object of the invention to provide an improved drum flap.

This object is achieved by a drum flap described herein.

SUMMARY

The invention provides a drum flap having a curved surface, which forms a first region, and two circle-segment surfaces, which each form a second region, and having a rim which runs around the outside, is arranged substantially in two planes, in which the pivot axis also lies, projects outward and serves to bear against correspondingly designed bearing surfaces, which drum flap has at least a second rim. This second rim serves in particular to improve the sealing, so that one drum flap can be used to control a plurality of, for example four, air passages, and when the rims bear against corresponding stops, there is no undesirable cross-flow on the part of the air. The curved surface is designed, for example, as a part-cylinder surface or a part-sphere surface.

According to a first embodiment, the second rim is provided in the first region and preferably also the second region of the drum flap. The second rim is preferably arranged in a plane in which the pivot axis also lies and projects outward, the plane in which the second rim lies being arranged in an angle between the two other planes in which the first rim lies. In this case, it is preferable for at least one opening to be provided in at least one segment of the first and/or second region, the corresponding segment being delimited by two adjacent rims, so that it is possible to reliably prevent a cross-flow of air. To prevent a cross-flow of the air in the region of the pivot axis and to increase the stability of the drum flap, it is preferable for a circular region with a thickness designed to match that of the rims to be provided in the region of the pivot axis.

According to a second embodiment, the second rim runs substantially around a third region, which directly or indirectly, separated by an intermediate region, adjoins the lateral surface in the region of the first rim. This third region is preferably approximately rectangular in form, although it may also take a different form, surrounded by a second rim, which is used in particular for sealing purposes, so that a cross-flow can be prevented.

It is preferable for the planes in which the third region and the intermediate region lie to be arranged at an angle not equal to 180° with respect to one another. In this context, it is preferable to use an angle of less than 180° to 120°.

The drum flap is preferably used as an air distributor flap and/or as a temperature mixing flap in a motor vehicle air-conditioning system, the drum flap according to the first embodiment preferably serving as an air distributor flap, and the drum flap according to the second embodiment preferably serving as a temperature mixing flap.

BRIEF DESCRIPTION OF THE DRAWINGS

In the text which follows, the invention is explained in detail on the basis of four exemplary embodiments and with reference to the drawings, in which.

DETAILED DESCRIPTION

Figure 1:
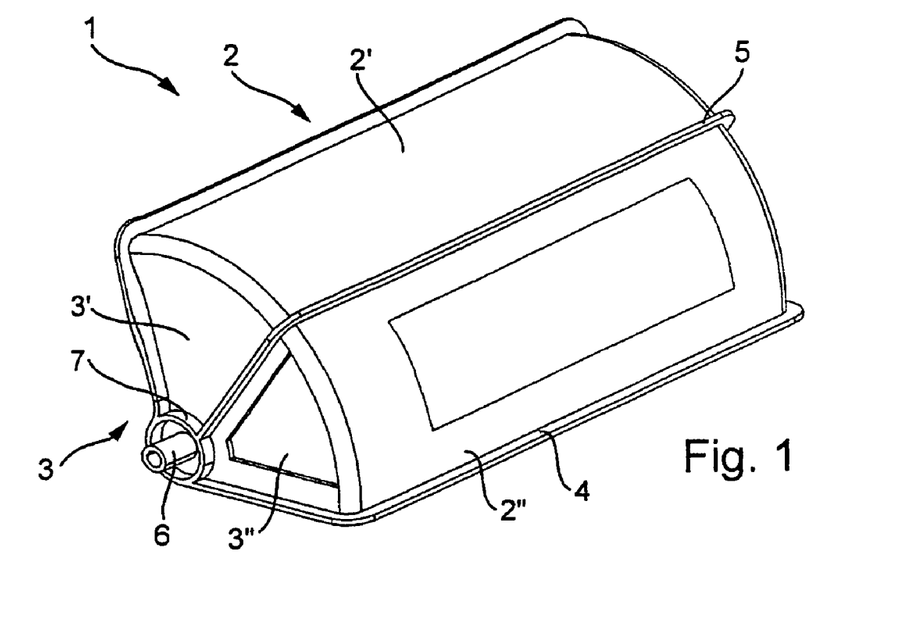
FIG. 1 shows a perspective view of a drum flap in accordance with the first exemplary embodiment.
Figure 2:
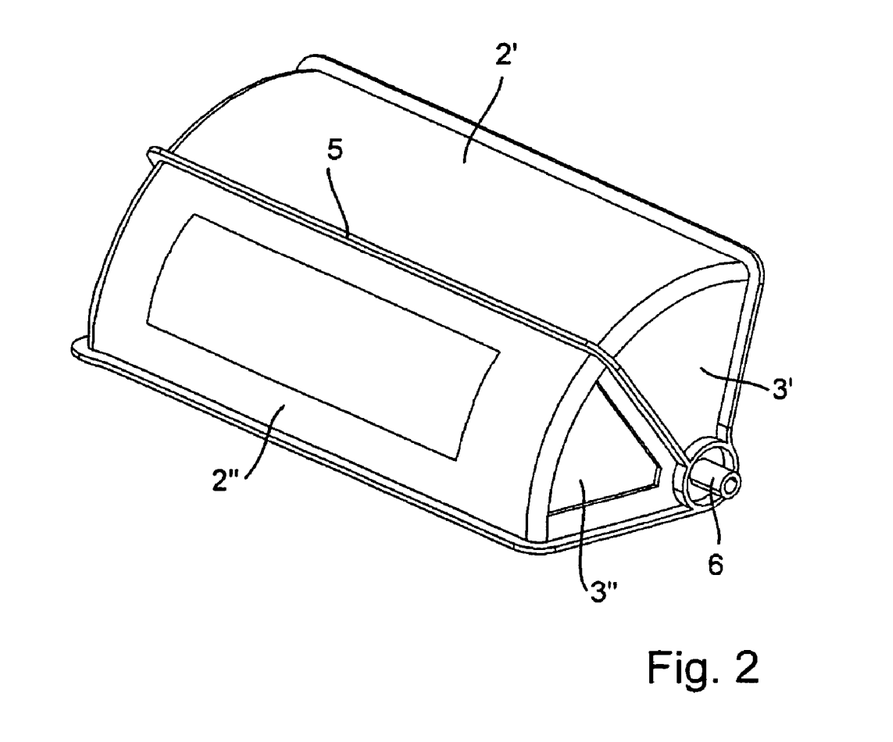
FIG. 2 shows the drum flap from FIG. 1 from a different perspective.

A drum flap 1 as used in particular in a motor vehicle air-conditioning system has a first region 2, which is formed by a subregion of a cylinder, and two second regions 3, which are formed by the circle segments of the side faces of the corresponding cylinder. The transition region is rounded in form. As in conventional drum flaps, a rim 4, protruding perpendicularly outward, runs around the edge of the first and second regions 2 and 3 respectively. This rim 4 forms a bearing surface which at the same time, by interacting with an associated second bearing surface formed on the air guidance housing of the air-conditioning system, also has a sealing function.

Next to the first rim 4 there is a second rim 5, which like the first rim 4 runs in a plane in which the pivot axis of the drum flap 1 also lies. In this case, the second rim 5 divides the first and second regions 2 and 3 in each case into two segments 2' and 2" or 3' and 3", respectively. According to the first exemplary embodiment, an opening (side opening) is provided in each of the segments 3" of the second region 3, whereas the segments 2', 2" and 3' are formed without openings.

To mount the drum flap 1, two bearing journals 6, which in the installed state are mounted in bearings are provided in the pivot axis. A circular region 7, which is part of the first and second rims 4 and 5 and also has a sealing function, is provided around the bearing journals 6.

Figure 3:
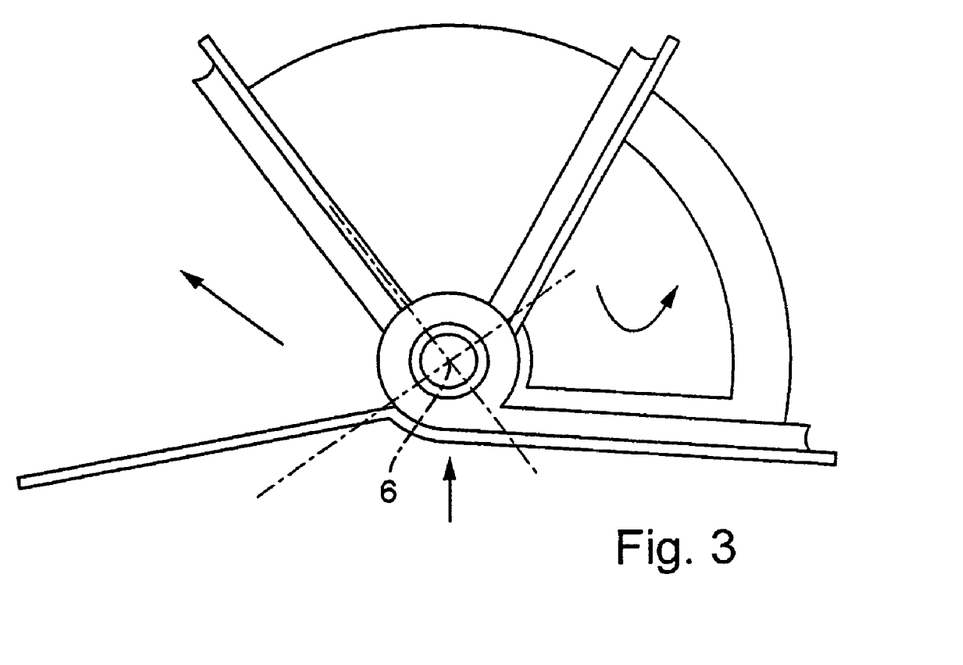
FIG. 3 shows a side view of the drum flap from FIG. 1 in order to illustrate its function in a first position.
Figure 4:
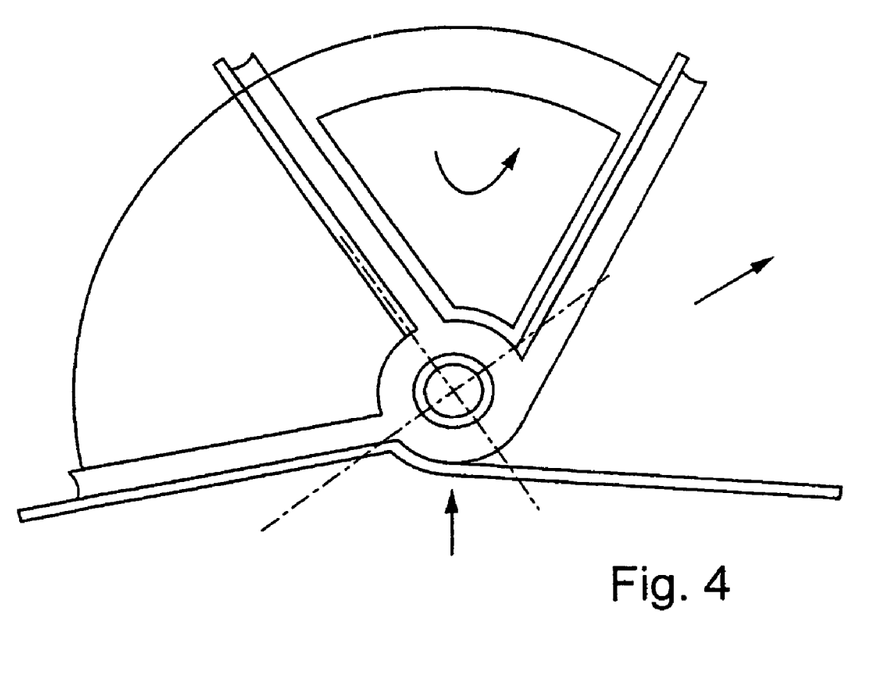
FIG. 4 shows a side view of the drum flap from FIG. 1 is a second position.

FIGS. 3 and 4 illustrate two positions of the drum flap 1 which is installed in an air-conditioning system, is used as an air distributor flap and serves to control the distribution of air between three air passages, namely the defrosting air passage, indicated in FIGS. 3 and 4 by "defrost", the footwell air passage, indicated in FIGS. 3 and 4, by "footwell", and the ventilation air passage, indicated in FIGS. 3 and 4 by "ventilation". The airflow is represented by arrows.

FIG. 3 shows a flap position in which a large amount of air is being fed to the windshield for defrosting purposes and some air is being fed to the vehicle interior compartment via the side opening. The footwell air passage is closed.

In the flap position shown in FIG. 4, the defrosting air passage is closed, some air is passing into the footwell air passage via the side opening and the ventilation air passage is fully open.

Figure 5:
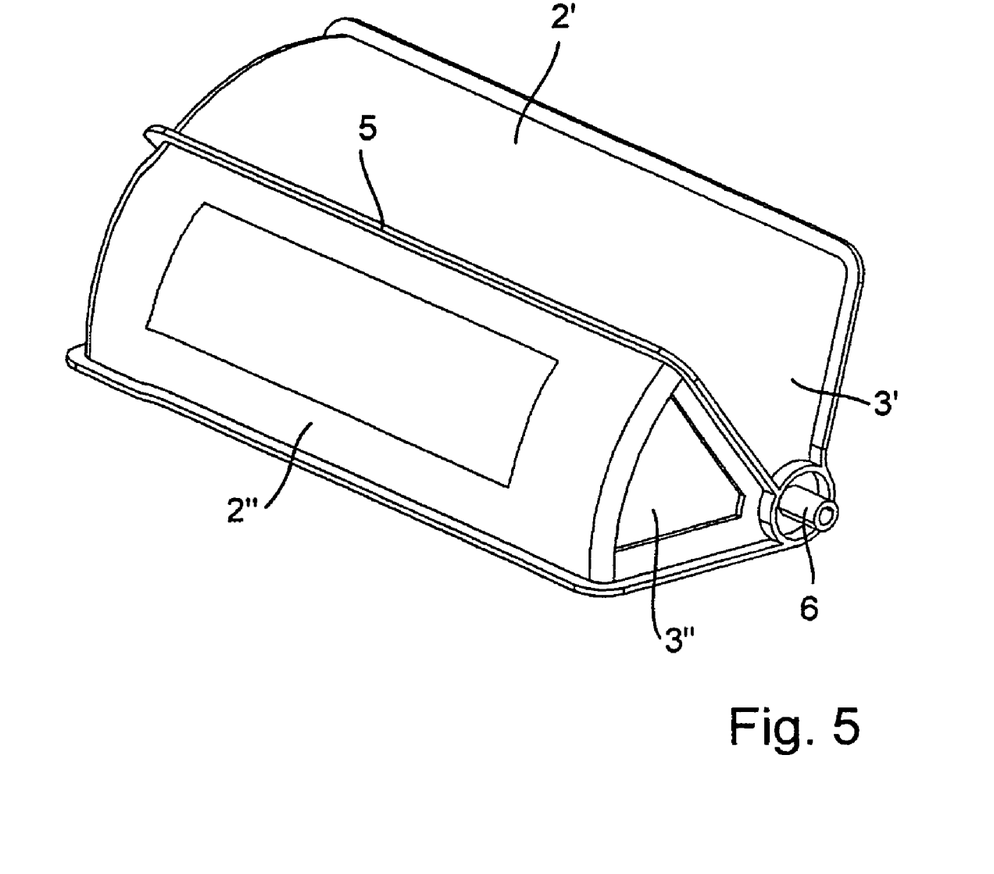
FIG. 5 shows a perspective view of a drum flap in accordance with the second exemplary embodiment.
Figure 6:
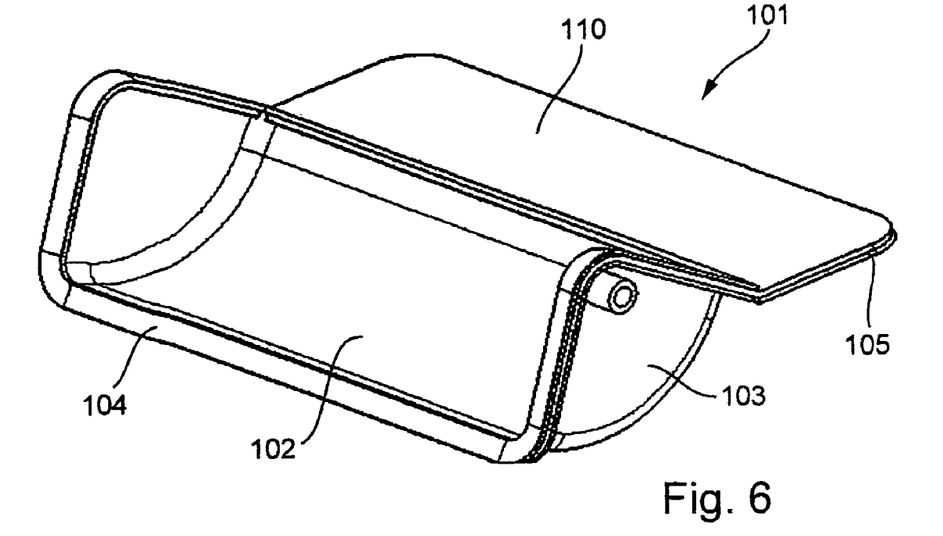
FIG. 6 shows a perspective view of a drum flap in accordance with the third exemplary embodiment.
Figure 7:
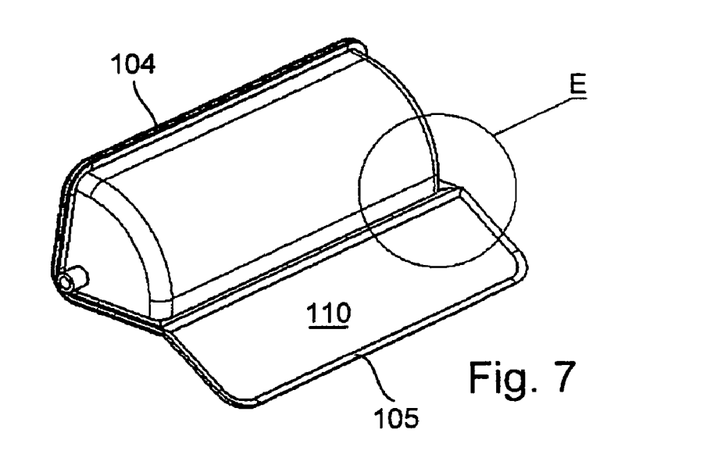
FIG. 7 shows the drum flap from FIG. 6 from a different perspective.

According to a second exemplary embodiment, which is illustrated in FIG. 5, an opening (front opening) is also provided in segment 2". Other arrangements of openings, for example an offset arrangement of side and front openings in individual segments, are possible. In this exemplary embodiment too, there are two rims 4 and 5 which are used for sealing purposes.

A drum flap 101 in accordance with the third exemplary embodiment is illustrated in FIGS. 6 to 11. In this case, the drum flap 101 has a first region 102, which is formed by a subregion of a cylinder, and two second regions 103, which are formed by circle segments of the side faces of the corresponding cylinder. The transition region is rounded in form. As in conventional drum flaps, a rim 104, protruding perpendicularly outward, runs around the edge of the first and second regions 102 and 103, respectively. This rim 104 forms a bearing surface which, in the same way as the rim 4 of the first and second exemplary embodiments, by interacting with an associated second bearing surface formed on the air guidance housing of the air-conditioning system, at the same time also has a sealing function.

Figure 8:
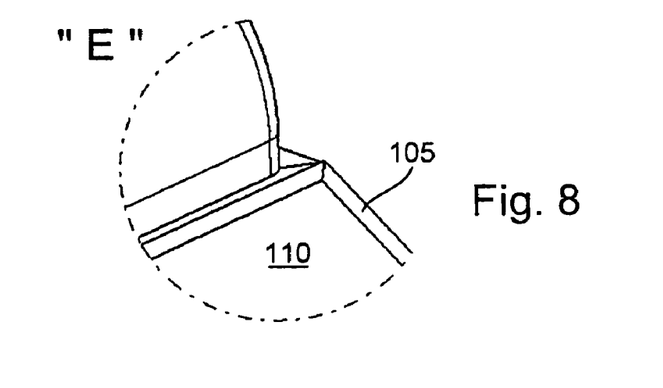
FIG. 8 shows a detail view of region E from FIG. 7.
Figure 9:
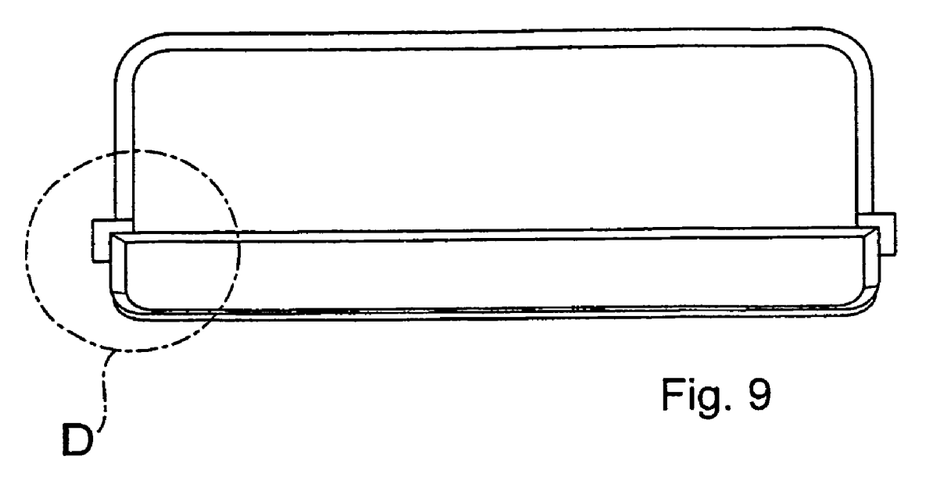
FIG. 9 shows the drum flap from FIG. 6 from a different perspective.
Figure 10:
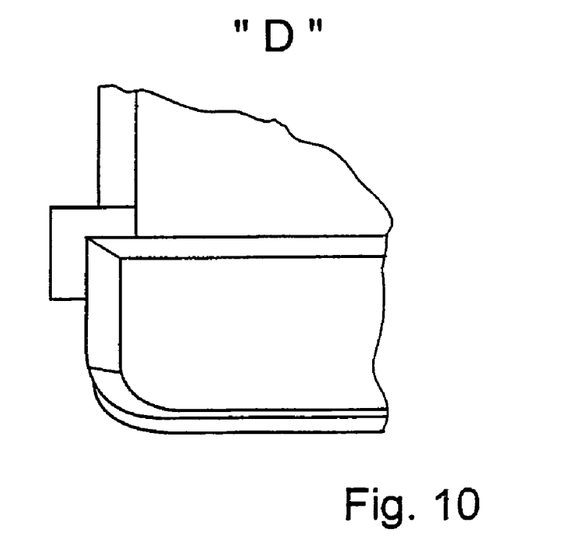
FIG. 10 shows a detail view of region D from FIG. 9.
Figure 11:
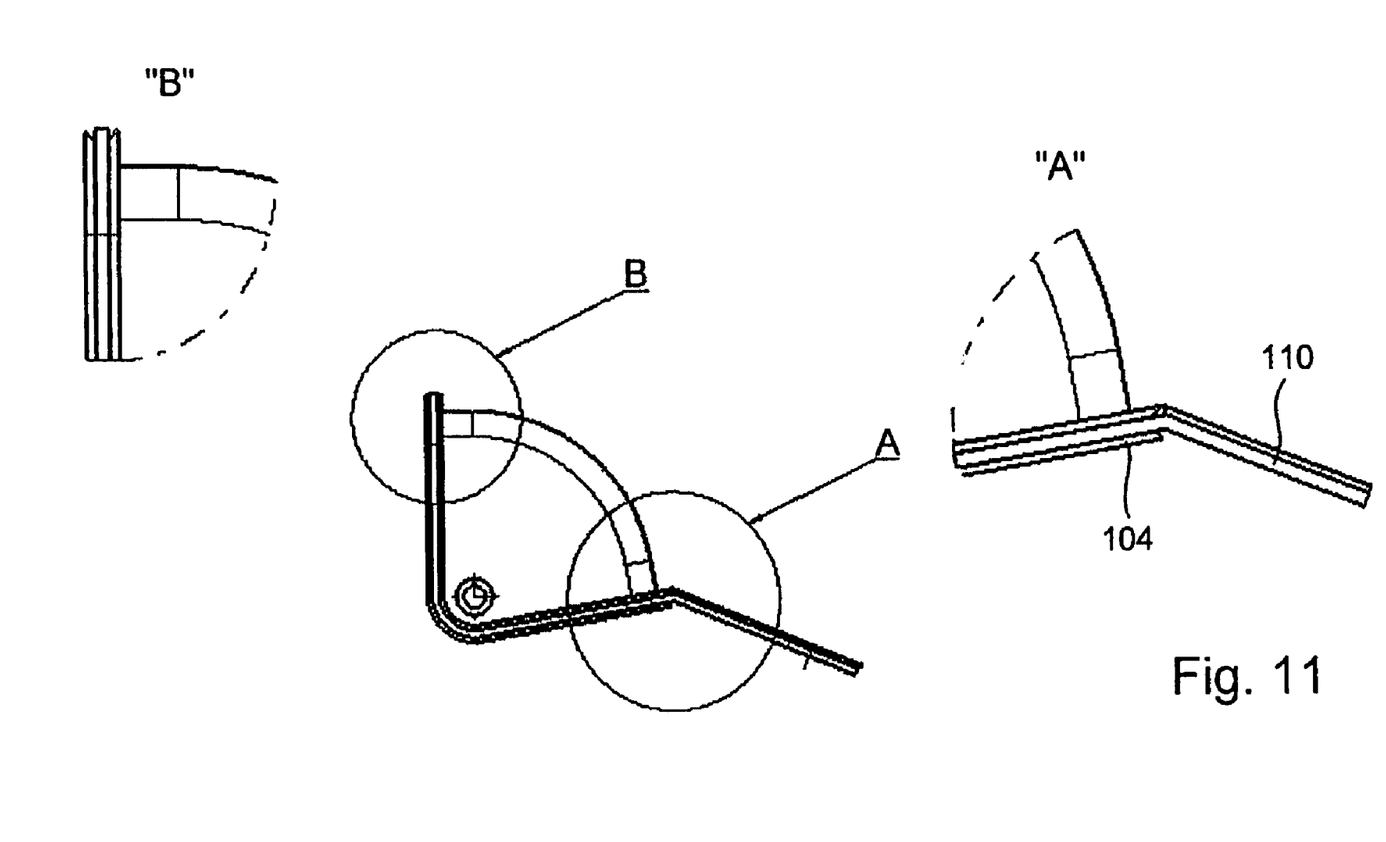
FIG. 11 shows a side view of the drum flap from FIG. 6 with two detail views, FIG. 12$a$-$c$ show three views of a motor vehicle air-conditioning system with the drum flap from FIG. 6 in different positions.

As can be seen in particular from FIG. 8, the first region 102 is adjoined by a third region 110, which is rectangular in form and is delimited on one side by the corresponding rim 104 and on the other three sides by a second rim 105. The transition between the rims 104 and 105 is formed in sealing fashion, so that in principle the two regions 102 and 110 are each completely surrounded by a delimiting rim and are therefore sealed off independently of one another when the corresponding rim bears against a bearing surface.

Figure 12A:
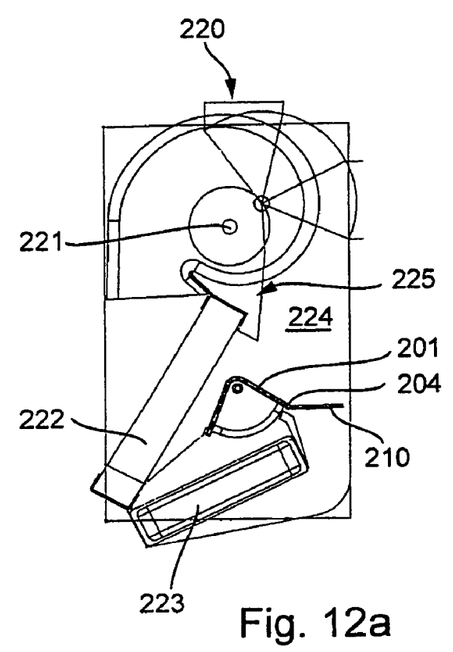
Figure 12B:
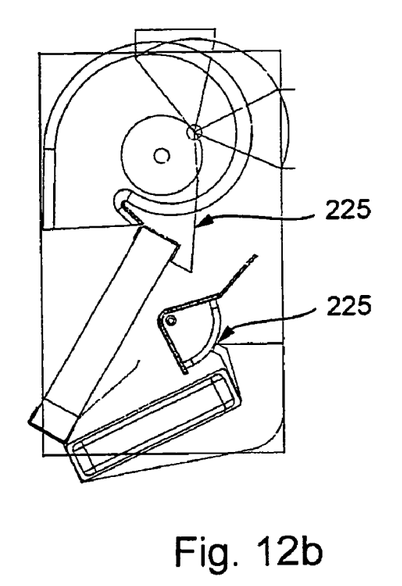
Figure 12C:
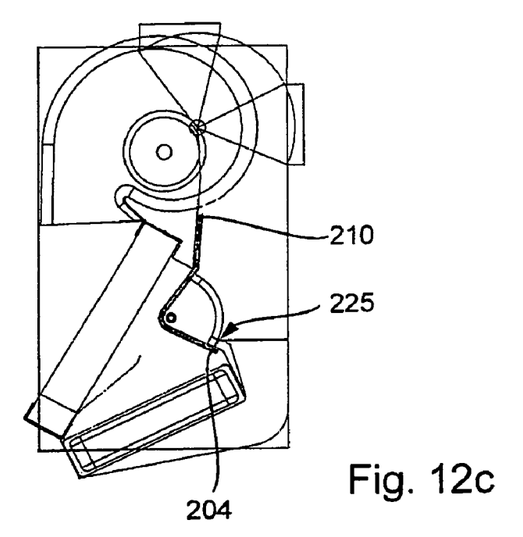

FIGS. 12a to 12c illustrate a motor vehicle air-conditioning system 220 having a fan 221, an evaporator 222, a radiator 223, a drum flap 201, which corresponds to the drum flap of the third exemplary embodiment, and a mixing space 224. In this case, the drum flap 201 in FIG. 12a blocks off the passage of air through the radiator 223, so that the air fed to the vehicle interior compartment is cooled to its maximum extent.

FIG. 12b illustrates an intermediate position of the drum flap 201, while FIG. 12c illustrates a position in which all of the air is passed through the radiator 223 and therefore heated to the maximum extent. As can be seen in FIGS. 12a to 12c, in the limit positions the drum flap 201 bears against stops 225 which are formed on the air guidance housing of the air-conditioning system 220. The rims 205 and 210 ensure that no air passes into the mixing space 224 in the closed position.

FIGS. 13 to 15f show a second motor vehicle air-conditioning system 320, having a fan 321, an evaporator 322, a radiator 323, a first drum flap 301, which serves as a distributor flap and corresponds to the drum flap of the first exemplary embodiment, and a second drum flap 301', which serves as a temperature mixing flap, is illustrated in more detail in FIG. 16 and is described in more detail below, as well as a mixing space 324.

Figure 13:
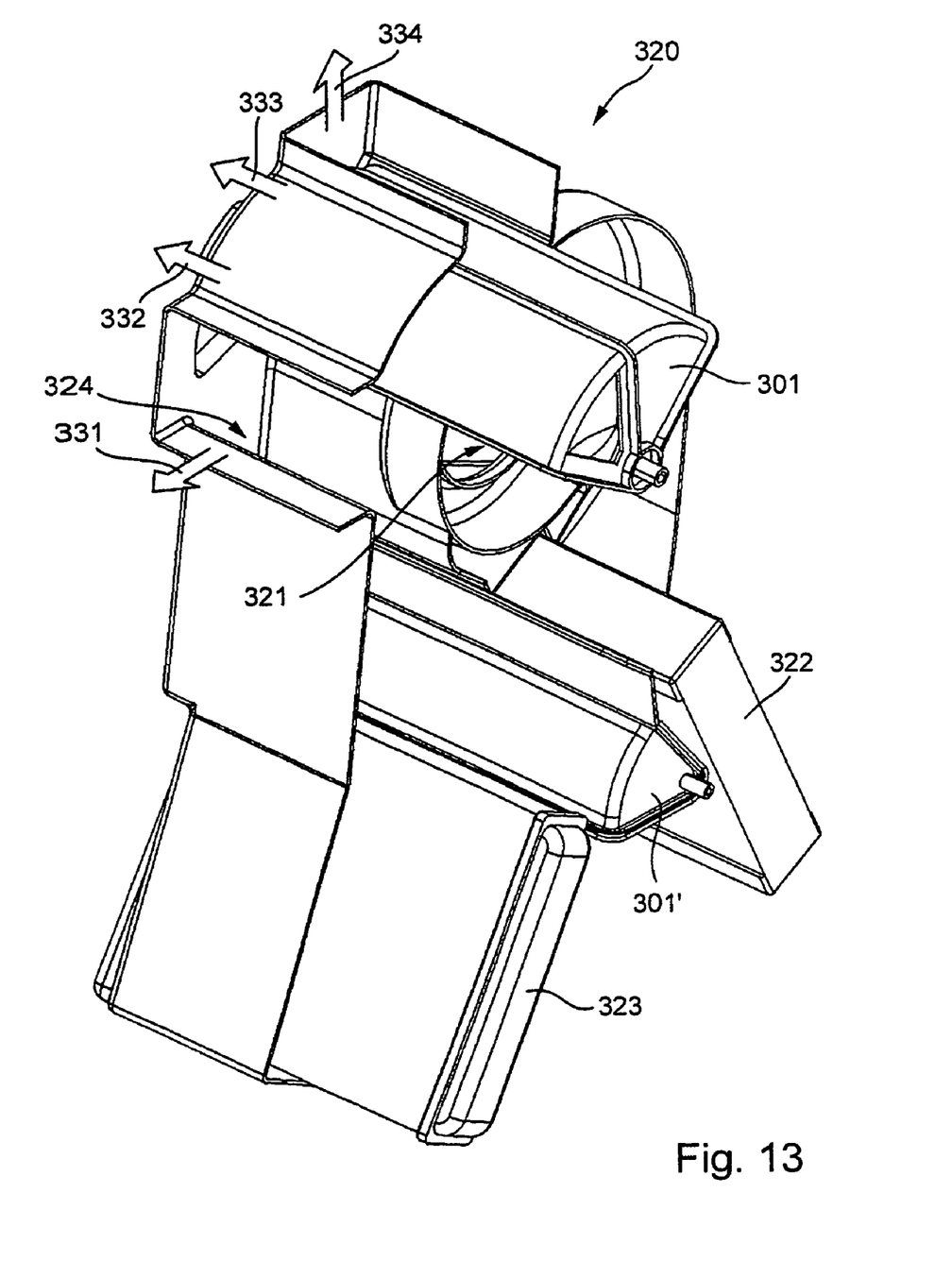
FIG. 13 shows a perspective view of a second motor vehicle air-conditioning system with two drum flaps.

The first drum flap 301 is used to distribute the air between a plurality of air passages, namely the air passage 331, which leads to the center nozzle, the air passage 332, which leads to the side nozzle, the air passage 333, which leads to the footwell, and the air passage 334, which is used to defrost the windshield.

The second drum flap 301', which as seen in the direction of airflow is arranged upstream of the first drum flap 301, has a first region 302, which is formed by a subregion of a cylinder, and two second regions 303, which are formed by the circle segments of the side faces of the corresponding cylinder. The transition region is rounded in form. As in the drum flaps 1 and 101 described above, a rim 304, protruding perpendicularly outward, runs around the edge of the first and second regions 302 and 303. This rim 304 forms a bearing surface which, like the rims of the exemplary embodiments described above, by interacting with an associated second bearing surface formed on the air guidance housing of the air-conditioning system, at the same time also has a sealing function.

Figure 16:
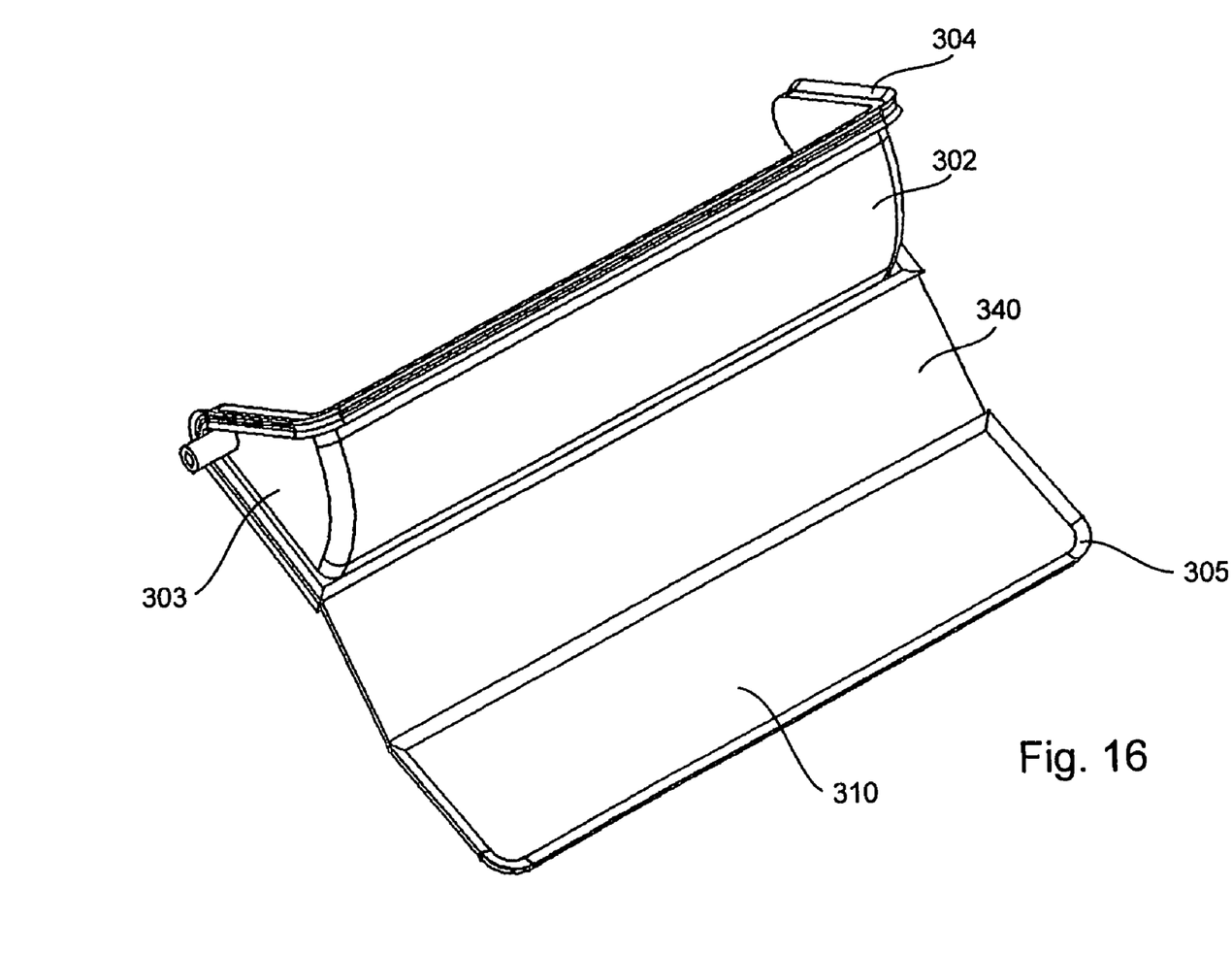
FIG. 16 shows the drum flap in accordance with the fourth exemplary embodiment used in the air-conditioning system from FIG. 13 in the form of a perspective illustration.

As can be seen from FIG. 16, an intermediate region 340 adjoins the first region 302 and is in turn adjoined by a third region 310 which is rectangular in form. In this case, the third region 310 is delimited by a second rim 305 on all four sides. In the present case, the intermediate region 340 and the third region 310 are arranged at an angle of approx. 140° with respect to one another, to enable complete sealing of the flow path of the air through the radiator 323 to be avoided (cf. for example FIG. 15c), since the rims 304 and 305 bear tightly against bearing surfaces formed by the air guidance housing. The width of the intermediate region 340 approximately corresponds to the thickness of the radiator 323.

According to the present exemplary embodiment, the intermediate region 340 and the third region 310 are arranged at an angle not equal to 180° with respect to one another, although it is also possible for them both to be arranged in one plane.

Figure 14:
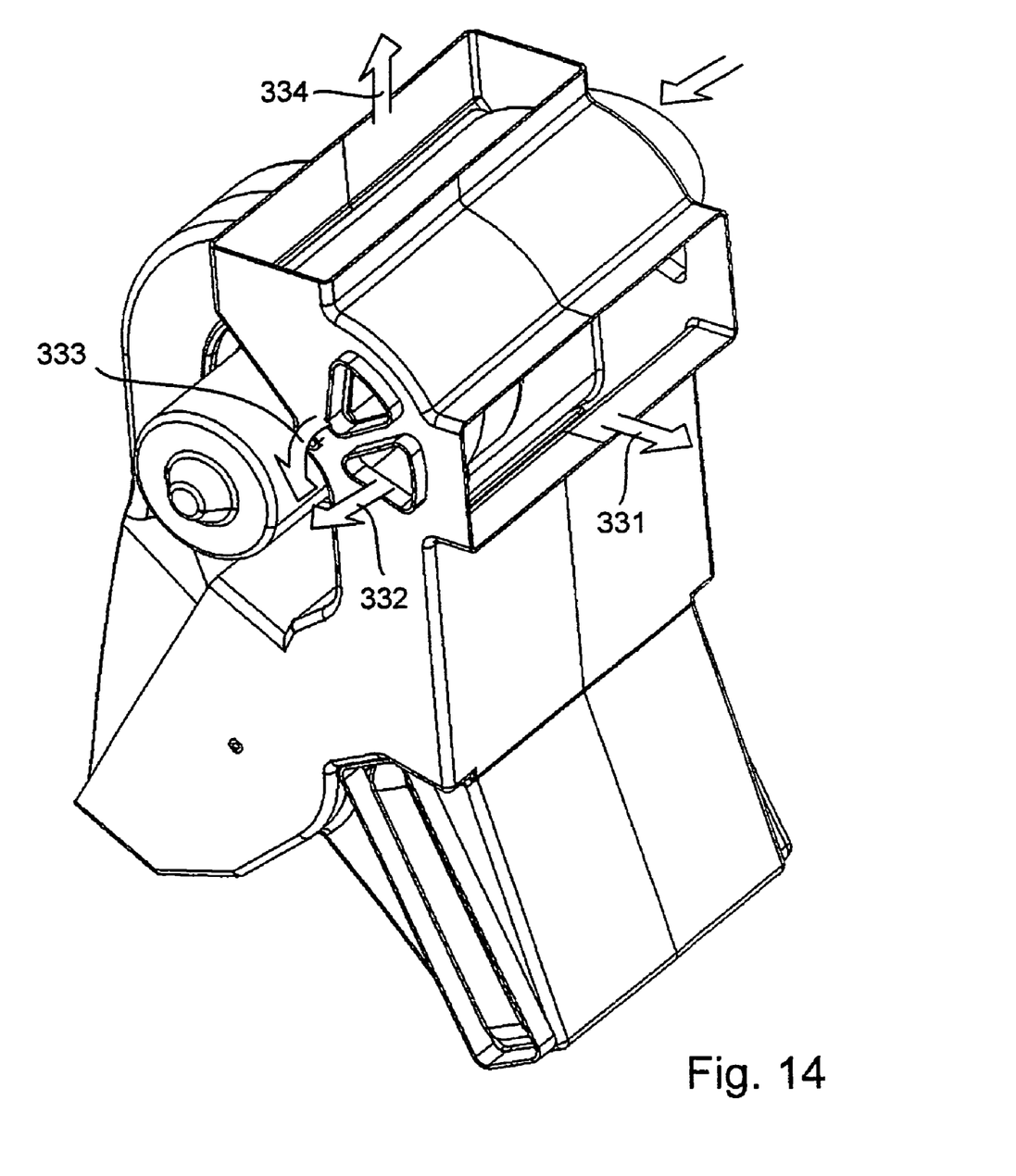
FIG. 14 shows the air-conditioning system from FIG. 13 from a different perspective, FIG. 15$a$-$f$ show side views of the air-conditioning system from FIG. 13 with various flap positions.

The fan 321 draws in fresh air or recirculated air, as illustrated by an arrow in the top right of FIG. 14. This air is passed through the evaporator 322 and, depending on the position of the second drum flap 301', bypasses the radiator 323 and/or is passed through the latter. The air is mixed in the mixing space 324 if the second drum flap 301' splits the air stream. Then, depending on the position of the first drum flap 301, the air is distributed between the air passages 331, 332, 333 and 334 and is fed to the vehicle interior compartment.

Figure 15A:
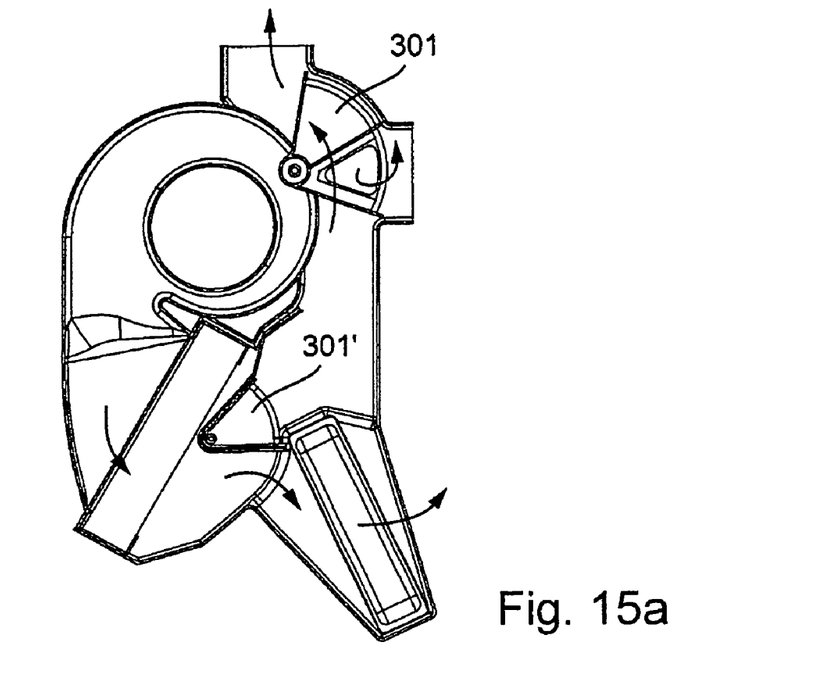

Various positions of the two drum flaps 301 and 301' are illustrated in FIG. 15a to 15f. FIG. 15a shows the "maximum heating" position of the second drum flap 301', in which the warm air is fed to the windshield in order to defrost it and to the side nozzle, i.e. the air passages 332 and 334 are opened up while the air passages 331 and 333 are tightly closed.

Figure 15B:
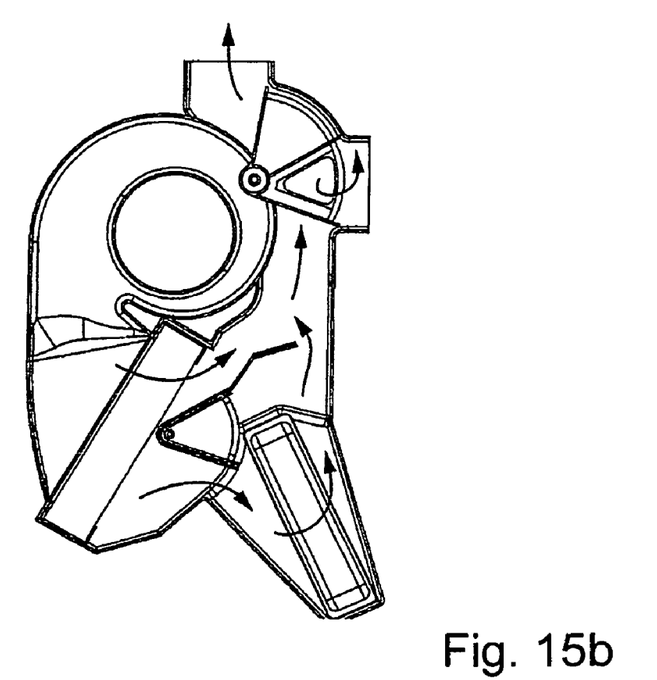
Figure 15C:
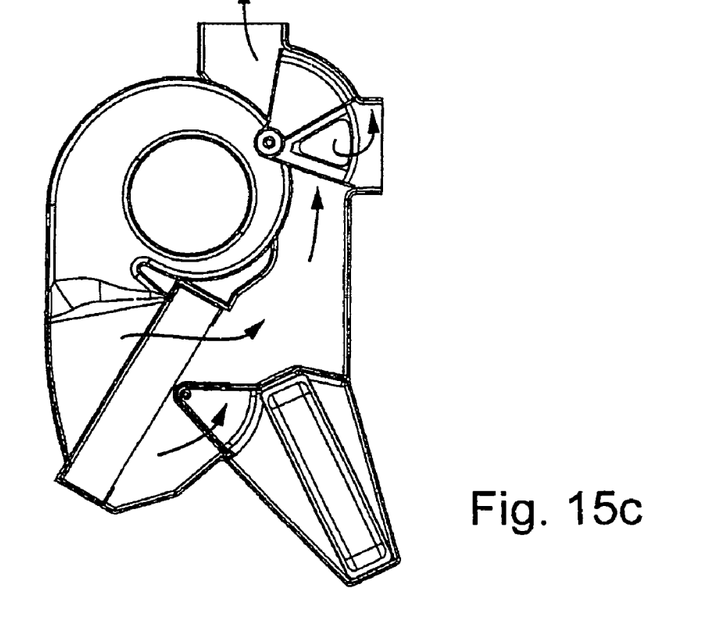
Figure 15D:
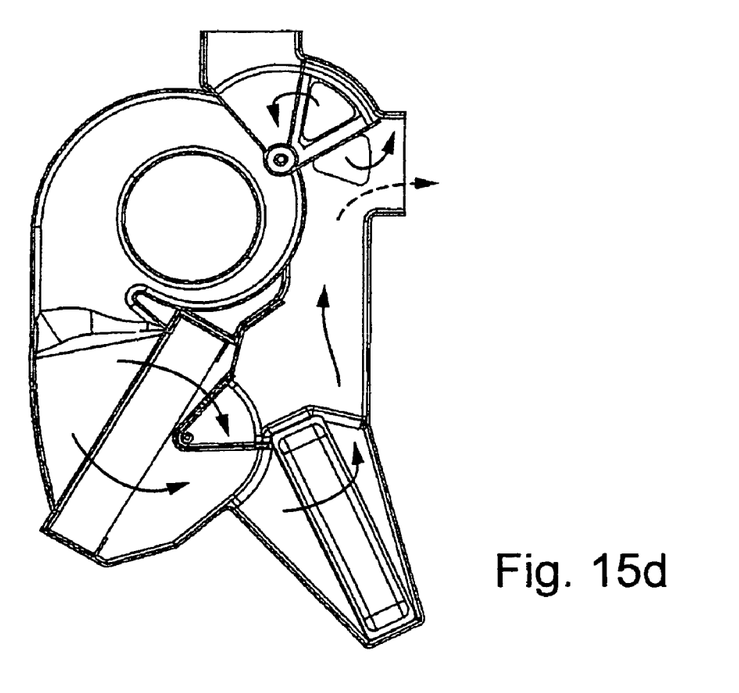

FIG. 15b shows a mix position of the second drum flap 301', so that the warm and cold air is mixed in the mixing space 324. The position of the first drum flap 301 corresponds to that shown in FIG. 15a, so that the air, the temperature of which has been controlled according to the opening of the second drum flap 301', is fed to the windshield in order to defrost the latter and to the side nozzle. According to FIG. 15c, cold air is fed to the windshield in order to defrost the latter and to the side nozzle, since the second drum flap 301', on account of its configuration, is tightly blocking the path through the radiator 323, specifically both from the front and from the rear.

Figure 15E:
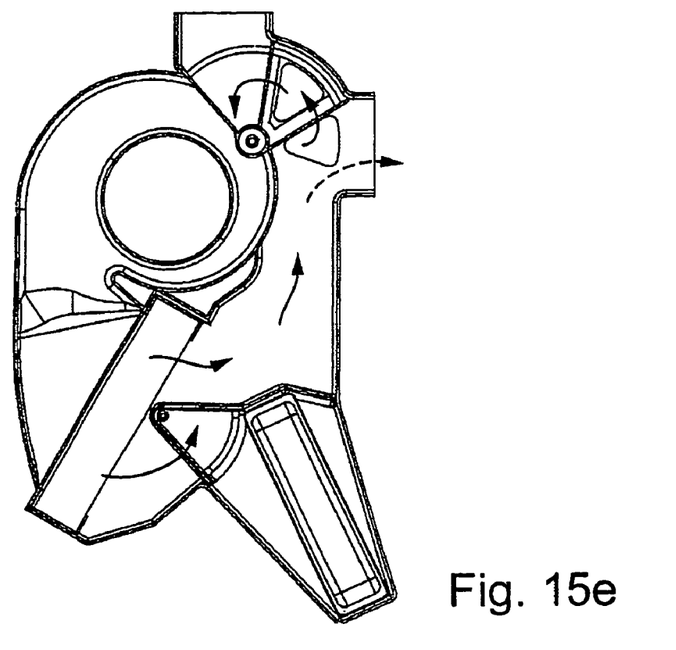
Figure 15F:
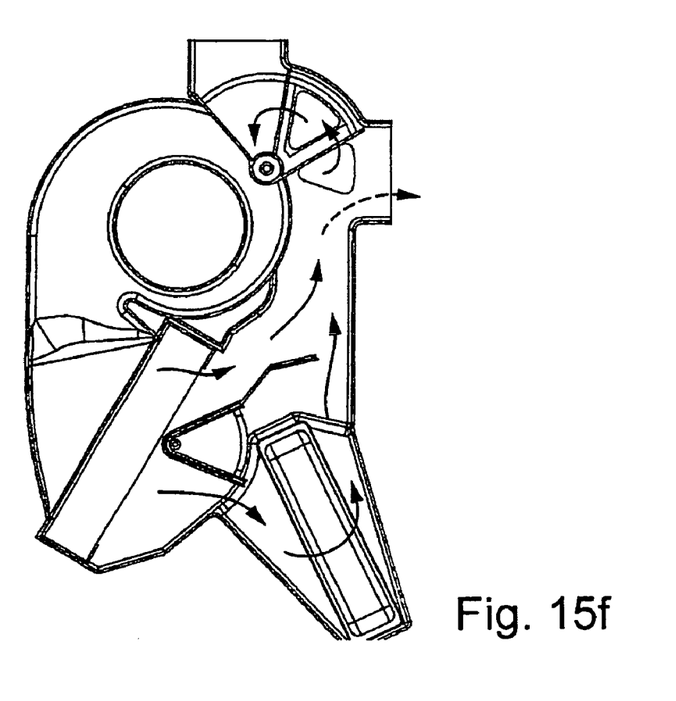

FIG. 15d once again shows the "maximum heating" position of the second drum flap 301'(cf. FIG. 15a), but with the first drum flap 301 pivoted in such a manner that the air is fed to the vehicle interior compartment via the air passages 331, 332 and 333 while the air passage 334 is closed. The precision setting of the air distribution between these three air passages can be effected in situ by means of the corresponding nozzles. FIG. 15e shows a corresponding air distribution for maximum cooled air and FIG. 15f shows the corresponding air distribution for temperature-controlled air.

On account of their correspondingly configured rims, the drum flaps of all the exemplary embodiments allow good sealing between the drum flap and the corresponding bearing surfaces, so that optimized temperature control of the air is possible.

LIST OF DESIGNATIONS 1, 101, 201, 301, 301' drum flap
2, 102, 302 first region
2', 2" segment
3, 103, 303 second region
3', 3" segment
4, 104, 304 first rim
5, 105, 305 second rim
6 bearing journal
7 circular region
110, 310 third region
220, 320 air-conditioning system
221, 321 fan
222, 322 evaporator
223, 323 radiator
224, 324 mixing space
225 bearing surface
331, 332, 333, 334 air passage
340 intermediate region

The invention claimed is:

1. A drum flap comprising:
a circumferential surface of a part-cylinder, wherein the circumferential surface forms a first region,
two circle segment surfaces forming lateral side surfaces of the part-cylinder, wherein each circle segment surface forms a second region,
an externally surrounding rim, which is arranged substantially in two planes, projects perpendicularly outward from the circumferential surface along two edges of the circumferential surface that run along a longitudinal direction of the circumferential surface, and serves to bear against correspondingly designed bearing surfaces,
at least a second rim, which serves to bear against a corresponding designed bearing surface,
a third region with a planar surface, wherein the second rim extends above the planar surface of the third region and runs substantially around the third region, and
a planar intermediate region arranged at an angle not equal to 180° from the third region, wherein the third region indirectly adjoins a lateral surface in a region of the externally surrounding rim via the intermediate region.

2. The drum flap as claimed in claim 1, wherein the drum flap has at least one opening in at least one segment of the first region, one or both of the second regions, or a combination thereof.

3. The drum flap as claimed in claim 1, wherein the third region is approximately rectangular in form.

4. The drum flap as claimed in claim 1, wherein two outwardly protruding bearing journals are provided on a pivot axis.

5. An air-conditioning system comprising:
an air guidance housing, and
a drum flap arranged in the air guidance housing,
wherein the drum flap comprises:
a circumferential surface of a part-cylinder, wherein the circumferential surface forms a first region,
two circle segment surfaces forming lateral side surfaces of the part-cylinder, wherein each circle segment surface forms a second region,
an externally surrounding rim, which is arranged substantially in two planes, projects perpendicularly outward from the circumferential surface along two edges of the circumferential surface that run along a longitudinal direction of the circumferential surface, and serves to bear against correspondingly designed bearing surfaces,
at least a second rim, which serves to bear against a corresponding designed bearing surface,
a third region with a planar surface, wherein the second rim extends above the planar surface of the third region and runs substantially around the third region, and
a planar intermediate region arranged at an angle not equal to 180° from the third region, wherein the third region indirectly adjoins a lateral surface in a region of the externally surrounding rim via the intermediate region.

6. The air-conditioning system as claimed in claim 5, wherein the drum flap serves as an air distributor flap and/or as a temperature mixing flap.

7. The drum flap as claimed in claim 1, wherein the intermediate region is approximately rectangular in form.

8. The air-conditioning system as claimed in claim 5, wherein the intermediate region is approximately rectangular in form.

9. A drum flap comprising:
a circumferential surface of a part-cylinder, wherein the circumferential surface forms a first region;
two circle segment surfaces forming lateral side surfaces of the part-cylinder, wherein each circle segment surface forms a second region;
an externally surrounding rim, which is arranged substantially in two planes, projects perpendicularly outward from the circumferential surface along two edges of the circumferential surface that run along a longitudinal direction of the circumferential surface, and serves to bear against correspondingly designed bearing surfaces;
at least a second rim, wherein the second rim serves to bear against a corresponding designed bearing surface or projects perpendicularly outward from a circumferential surface of the part-cylinder surface, the circle segment surfaces, or a combination thereof; and
one of:

(a) at least one opening in at least one segment of the first region, one or both of the second regions, or a combination thereof such that the at least one segment is delimited by the externally surrounding rim and the second rim; or
(b) a third region indirectly adjoining a lateral surface in a region of the externally surrounding rim via a planar intermediate region such that the intermediate region is arranged at an angle not equal to 180° from the third region, which has a planar surface such that the second rim extends above the planar surface of the third region and runs substantially around the third region.

* * * * *